United States Patent [19]
Mannava et al.

[11] Patent Number: 5,591,009
[45] Date of Patent: Jan. 7, 1997

[54] LASER SHOCK PEENED GAS TURBINE ENGINE FAN BLADE EDGES

[75] Inventors: Seetharamaiah Mannava; Albert E. McDaniel, both of Cincinnati; William D. Cowie, Zenia; Herbert Halila, Cincinnati; James E. Rhoda, Mason; James E. Gutknecht, Cincinnati, all of Ohio

[73] Assignee: General Electric Company, Cincinnati, Ohio

[21] Appl. No.: 373,133

[22] Filed: Jan. 17, 1995

[51] Int. Cl.$^6$ ........................................ F01D 5/14
[52] U.S. Cl. .................. 416/241 R; 219/121.68; 148/525; 148/903
[58] Field of Search ............. 416/223 A, 241 R; 219/121.68, 121.69; 148/525, 565, 903

[56] References Cited

U.S. PATENT DOCUMENTS

| | | | |
|---|---|---|---|
| 1,763,256 | 6/1930 | Ray | 416/241 R |
| 3,566,662 | 3/1971 | Champoux . | |
| 3,689,176 | 9/1972 | Howell et al. . | |
| 3,850,698 | 11/1974 | Mallozzi et al. . | |
| 4,002,403 | 1/1977 | Mallozzi et al. . | |
| 4,060,769 | 11/1977 | Mallozzi et al. . | |
| 4,121,894 | 10/1978 | Cretella et al. | 416/241 R |
| 4,401,477 | 8/1983 | Clauer et al. . | |
| 4,426,867 | 1/1984 | Neal et al. | 416/241 R |
| 4,557,033 | 12/1985 | Champoux . | |
| 4,934,170 | 6/1990 | Easterbrook et al. . | |
| 4,937,421 | 6/1990 | Ortiz, Jr. et al. . | |
| 5,127,019 | 6/1992 | Epstein et al. . | |
| 5,131,957 | 7/1992 | Epstein et al. . | |
| 5,226,785 | 6/1993 | Narayana et al. . | |
| 5,306,360 | 4/1994 | Bharti et al. . | |
| 5,307,622 | 5/1994 | Ciokajlo et al. . | |

FOREIGN PATENT DOCUMENTS 85278  8/1983  European Pat. Off. ............ 148/565

OTHER PUBLICATIONS

American Machinist, "Laser Shocking Extends Fatigue Life", by John A. Vaccari, pp. 62–64, Jul. 1992, A Penton Publication.

Materials and Processing Report, "Laser Shock Processing Increases The Fatigue Life Of Metal Parts", Elsevier Science Publishing Co., Inc., pp. 3–5, Sep. 1991.

*Primary Examiner*—James Larson
*Attorney, Agent, or Firm*—Andrew C. Hess; Nathan D. Herkamp

[57] ABSTRACT

Gas turbine engine fan blade with a metallic airfoil having a leading edge, a trailing edge, and a radially outer tip, and at least one laser shock peened surface located along the leading edge with a region having deep compressive residual stresses imparted by laser shock peening (LSP) extending into the airfoil from the laser shock peened surface.

4 Claims, 3 Drawing Sheets

LASER SHOCK PEENED GAS TURBINE ENGINE FAN BLADE EDGES

The Government has rights in this invention pursuant to Contract No. F33657-88C-2133 awarded by the Department of the Air Force.

RELATED PATENT APPLICATIONS

The present Application deals with related subject matter in co-pending U.S. patent application Ser. No. 08/319,346, entitled "LASER SHOCK PEENED ROTOR COMPONENTS FOR TURBOMACHINERY", filed Oct. 6, 1994, assigned to the present Assignee.

The present Application deals with related subject matter in co-pending U.S. patent application Ser. No. 08/362,363, entitled "ON THE FLY LASER SHOCK PEENING", filed Dec. 22, 1994, assigned to the present Assignee, and having one inventor in common with the present application.

BACKGROUND OF THE INVENTION

1. Field of the Invention

This invention relates to gas turbine engine rotor blades and, more particularly, to leading edges having localized compressive residual stresses imparted by laser shock peening.

2. Description of Related Art

Gas turbine engines and, in particular, aircraft gas turbine engines rotors operate at high rotational speeds that produce high tensile and vibratory stress fields within the blade and make the fan blades susceptible to foreign object damage (FOD). Vibrations may also be caused by vane wakes and inlet pressure distortions as well as other aerodynamic phenomena. This FOD causes nicks and tears and, hence, stress concentrations in leading and trailing edges of fan blade airfoils. These nicks and tears become the source of high stress concentrations or stress risers and severely limit the life of these blades due to High Cycle Fatigue (HCF) from vibratory stresses. FOD damage may also result in a loss of engine due to a release of a failed blade. It is also expensive to refurbish and/or replace fan blades and, therefore, any means to enhance the rotor capability and, in particular, to extend aircraft engine fan blade life is very desirable. The present solution to the problem of extending the life of fan blades is to design adequate margins by reducing stress levels to account for stress concentration margins on the airfoil edges. This is typically done by increasing thicknesses locally along the airfoil leading edge which adds unwanted weight to the fan blade and adversely affects its aerodynamic performance. Another method is to manage the dynamics of the blade by using blade dampers. Dampers are expensive and may not protect blades from very severe FOD. These designs are expensive and obviously reduce customer satisfaction.

Therefore, it is highly desirable to design and construct longer lasting fan blades that are better able to resist both low and high cycle fatigue than present fan blades. The present invention is directed towards this end and provides a fan blade with regions of deep compressive residual stresses imparted by laser shock peening leading and trailing edge surfaces of the fan blade.

The region of deep compressive residual stresses imparted by laser shock peening of the present invention is not to be confused with a surface layer zone of a work piece that contains locally bounded compressive residual stresses that are induced by a hardening operation using a laser beam to locally heat and, thereby, harden the work piece such as that which is disclosed in U.S. Pat. No. 5,235,838, entitled "Method and apparatus for truing or straightening out of true work pieces". The present invention uses multiple radiation pulses from high power pulsed lasers to produce shock waves on the surface of a work piece similar no methods disclosed in U.S. Pat. No. 3,850,698, entitled "Altering Material Properties"; U.S. Pat. No. 4,401,477, entitled "Laser shock processing"; and U.S. Pat. No. 5,131,957, entitled "Material Properties". Laser peening as understood in the art and as used herein means utilizing a laser beam from a laser beam source to produce a strong localized compressive force on a portion of a surface. Laser peening has been utilized to create a compressively stressed protection layer at the outer surface of a workpiece which is known to considerably increase the resistance of the workpiece to fatigue failure as disclosed in U.S. Pat. No. 4,937,421, entitled "Laser Peening System and Method". However, the prior art does not disclose fan blade leading edges of the type claimed by the present patent nor the methods how to produce them. It is to this end that the present invention is directed.

SUMMARY OF THE INVENTION

The present invention provides a gas turbine engine fan blade having at least one laser shock peened surface along the leading and/or trailing edges of the blade and a region of deep compressive residual stresses imparted by laser shock peening (LSP) extending from the laser shock peened surface into the blade. Preferably, the blade has laser shock peened surfaces on both suction and pressure sides of the blade wherein both sides were simultaneously laser shock peened. The present invention can be used for new or used and repaired fan blades in which damage created stress risers such as nicks and/or tears have been suitably repaired.

ADVANTAGES

Among the advantages provided by the present invention is the improved ability to safely build gas turbine engine blades designed to operate in high tensile and vibratory stress fields which can better withstand fatigue failure due to nicks and tears in the leading and trailing edges of the fan blade and have an increased life over conventionally constructed fan blades. Another advantage of the present invention is that fan blades can be constructed with commercially acceptable life spans without increasing thicknesses along the leading and trailing edges, as is conventionally done, thus, avoiding unwanted weight on the blade. Another advantage of constructing fan blades without increasing thicknesses along the leading and trailing edges is improved aerodynamic performance of the airfoil that is available for blades with thinner leading and trailing edges. The present invention makes it possible to provide new and refurbished fan blades with enhanced capability and, in particular, extends the fan blade life in order to reduce the number of refurbishments and/or replacements of the blades. The present invention also allows aircraft engine fan blades to be designed with adequate margins by increasing vibratory stress capabilities to account for FOD or other fan blade damage without beefing up the area along the leading edges which increase the weight of the fan blade and engine. The present invention can be advantageously used to refurbish existing fan blades in order to ensure safe and reliable operation of older gas turbine engine fan blades while avoiding expensive redesign efforts or frequent replacement of suspect fan blades as is now often done or required.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
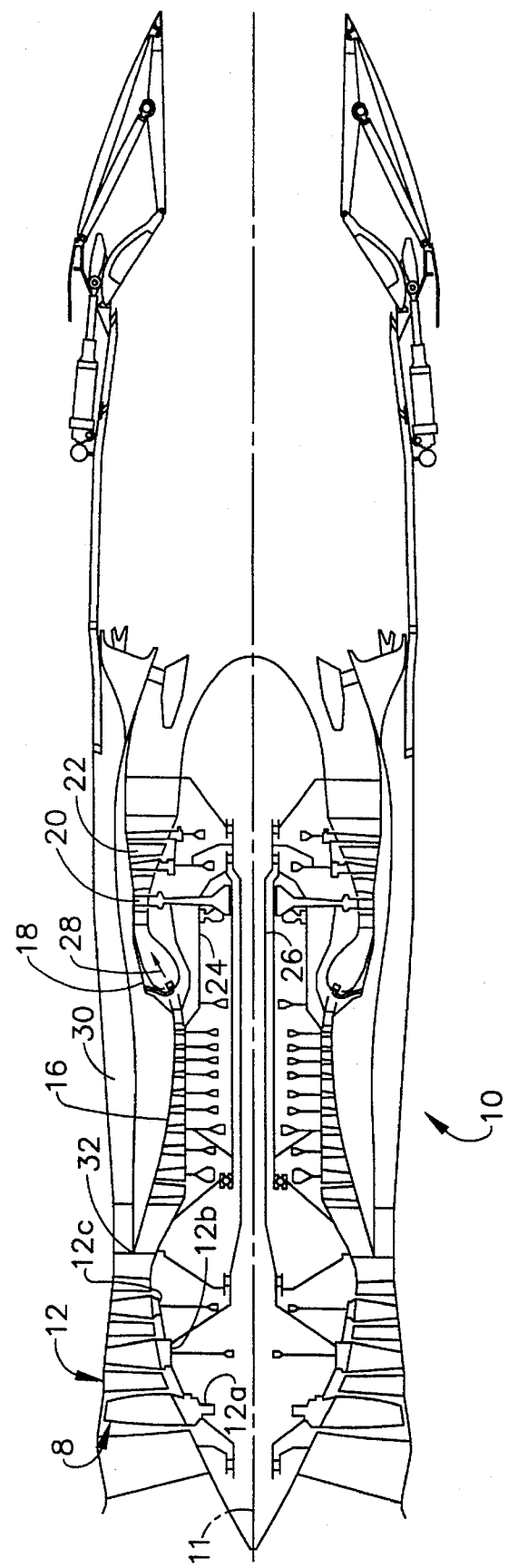
FIG. 1 is a cross-sectional illustrative view of an exemplary aircraft gas turbine engine in accordance with the present invention.

Illustrated in FIG. 1 is a schematic representation of an exemplary aircraft turbofan gas turbine engine 10 including a fan blade 8 in accordance with one embodiment of the present invention. The gas turbine engine 10 is circumferentially disposed about an engine centerline 11 and has, in serial flow relationship, a fan section 12, a high pressure compressor 16, a combustion section 18, a high pressure turbine 20, and a low pressure turbine 22. The combustion section 18, high pressure turbine 20, and low pressure turbine 22 are often referred to as the hot section of the engine 10. A high pressure rotor shaft 24 connects, in driving relationship, the high pressure turbine 20 to the high pressure compressor 16 and a low pressure rotor shaft 26 drivingly connects the low pressure turbine 22 to the fan section 12. Fuel is burned in the combustion section 18 producing a very hot gas flow 28 which is directed through the high pressure and low pressure turbines 20 and 22 respectively to power the engine 10. A portion of the air passing through the fan section 12 is bypassed around the high pressure compressor 16 and the hot section through a bypass duct 30 having an entrance or splitter 32 between the fan section 12 and the high pressure compressor 16. Many engines have a low pressure compressor (not shown) mounted on the low pressure rotor shaft 26 between the splitter 32 and the high pressure compressor 16. The fan section 12 is a multi-stage fan section, as are many gas turbine engines, illustrated by first, second, and third fan stages; 12a, 12b, and 12c respectively. The fan blade 8 of the present invention is designed to be used in a single stage fan section or in any stage of a multi-stage fan section.

Figure 2A:
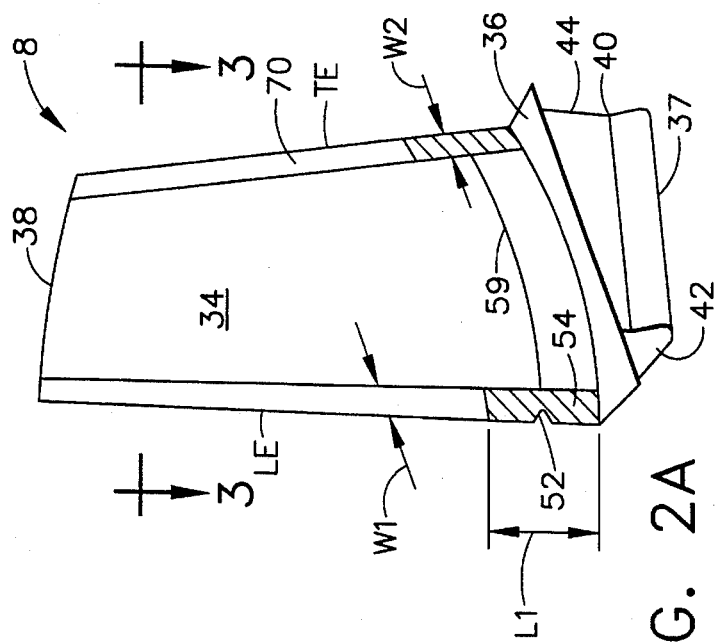
FIG. 2A is a perspective illustrative view of an alternative aircraft gas turbine engine fan blade including a laser shock peened radially extending portion of the leading edge in accordance with the present invention.
Figure 2:
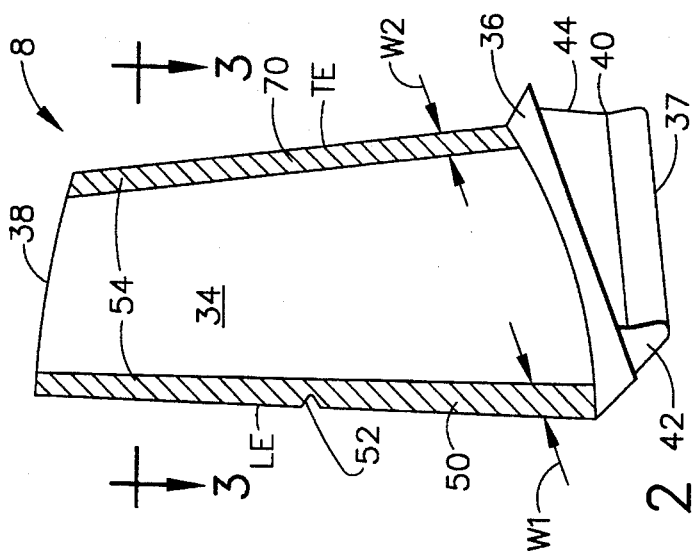
FIG. 2 is a perspective illustrative view of an exemplary aircraft gas turbine engine fan blade in accordance with the present invention.
Figure 3:
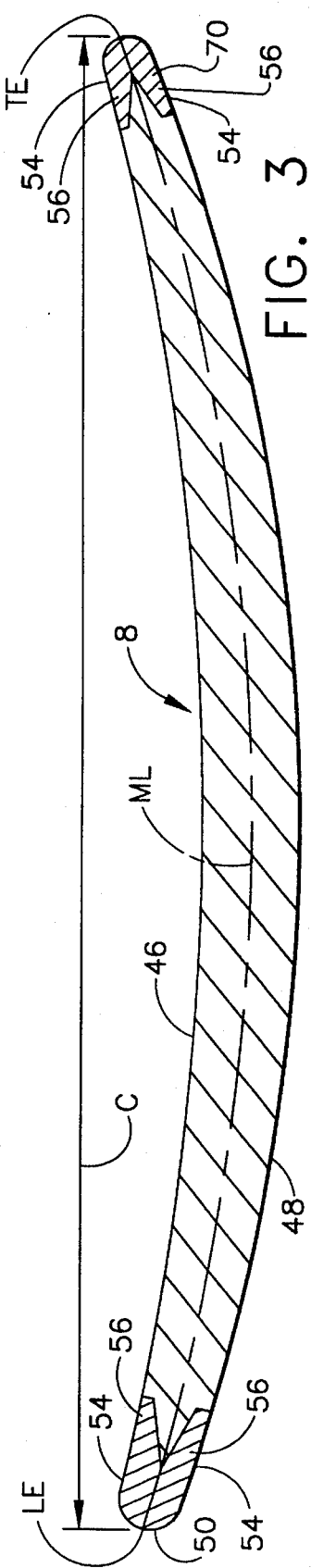
FIG. 3 is a cross sectional view through the fan blade taken along line 3—3 as illustrated in FIG. 2.

Referring to FIGS. 2 and 3, the fan blade 8 includes an airfoil 34 extending radially outward from a blade platform 36 to a blade tip 38. The fan blade 8 includes a root section 40 extending radially inward from the platform 36 to a radially inward end 37 of the root section 40. At the radially inward end 37 of the root section 40 is a blade root 42 which is connected to the platform 36 by a blade shank 44. The airfoil 34 extends in the chordwise direction between a leading edge LE and a trailing edge TE of the airfoil. A chord C of the airfoil 34 is the line between the leading LE and trailing edge TE at each cross section of the blade as illustrated in FIG. 3. A pressure side 46 of the airfoil 34 faces in the general direction of rotation as indicated by the arrow and a suction side 48 is on the other side of the airfoil and a mean-line ML is generally disposed midway between the two faces in the chordwise direction.

Referring again to FIG. 2, fan blade 8 has a leading edge section 50 that extends along the leading edge LE of the airfoil 34 from the blade platform 36 to the blade tip 38. The leading edge section 50 includes a predetermined first width W1 such that the leading edge section 50 encompasses nicks 52 and tears that may occur along the leading edge of the airfoil 34. The airfoil 34 is subject to a significant tensile stress field due to centrifugal forces generated by the fan blade 8 rotating during engine operation. The airfoil 34 is also subject to vibrations generated during engine operation and the nicks 52 and tears operate as high cycle fatigue stress risers producing additional stress concentrations around them.

To counter fatigue failure of portions of the blade along possible crack lines that can develop and emanate from the nicks and tears at least one and preferably both of the pressure side 46 and the suction side 48 have at least one laser shock peened surface 54 and a pre-stressed region 56 having deep compressive residual stresses imparted by laser shock peening (LSP) extending into the airfoil 34 from the laser shock peened surface as seen in FIG. 3. Preferably the airfoil has two laser shock peened surfaces 54 along the leading edge LE and the pre-stressed regions 56 are coextensive with the leading edge section 50 in the chordwise direction to the full extent of width W1 and are deep enough into the airfoil 34 to coalesce for at least a part of the width W1. The pre-stressed regions 56 are shown coextensive with the leading edge section 50 in the radial direction along the leading edge LE but may be shorter. The entire laser shock peened surfaces 54 is formed by overlapping laser shocked peened circular spots 58.

FIG. 2A illustrates the invention for a partial leading edge length pre-stressed regions 56 extending over a laser shock peened surface length L1 of the leading edge LE that is generally centered about a predetermined nodal line 59 where it intercepts the leading edge LE. Preferably, the nodal line 59 is one of a dominant failure mode due to vibratory stress. This stress may be due to excitations of the blade in flexure and torsional modes. The dominant failure mode may not always be the maximum stress mode but rather a lower stress mode or combination of modes that exist for longer durations over the engine's mission. By way of example the predetermined nodal line 59 illustrated in FIG. 2A is due to a first flex mode. A nick 52 located in this area of the leading edge LE has the greatest potential for failing the blade under resonance in this mode. Further by way of example, the laser shock peened surface length L1 of the partial leading edge length pre-stressed regions 56 may extend along the leading edge LE about 20% of the fan blade length from the tip 38 to the platform 36.

The present invention includes a fan blade construction with only the trailing edge TE having laser shock peened surfaces 54 on a trailing edge section 70 having a second width W2 and along the trailing edge TE. The associated pre-stressed regions 56 having deep compressive residual stresses imparted by laser shock peening (LSP) extends into the airfoil 34 from the laser shock peened surfaces 54 on the trailing edge section 70. At least one and preferably both of the pressure side 46 and the suction side 48 have a laser shock peened surfaces 54 and a pre-stressed region 56 having deep compressive residual stresses imparted by laser shock peening (LSP) extending into the airfoil 34 from the laser shock peened surfaces on a trailing edge section along the trailing edge TE. Preferably the compressive pre-stressed regions 56 are coextensive with the leading edge section 50 in the chordwise direction to the full extent of width W2 and are deep enough into the airfoil 34 to coalesce for at least a part of the width W2. The compressive pre-stressed regions 56 are shown coextensive with the leading edge section 50 in the radial direction along the trailing edge TE but may be shorter, extending from the tip 38 a portion of the way along the trailing edge TE towards the platform 36.

The laser beam shock induced deep compressive residual stresses in the compressive pre-stressed regions 56 are generally about 50–150 KPSI (Kilo Pounds per Square Inch) extending from the laser shocked surfaces 54 to a depth of about 20–50 mils into laser shock induced compressive residually stressed regions 56. The laser beam shock induced deep compressive residual stresses are produced by repetitively firing a high energy laser beam that is defocused ± a few mils with respect to the surface 54 which is covered with paint. The laser beam typically has a peak power density on the order of magnitude of a gigawatt/cm$^2$ and is fired through a curtain of flowing water that is flowed over the painted surface 54. The paint is ablated generating plasma which results in shock waves on the surface of the material. These shock waves are re-directed towards the painted surface by the curtain of flowing water to generate travelling shock waves (pressure waves) in the material below the painted surface. The amplitude and quantity of these shockwave determine the depth and intensity of compressive stresses. The paint is used to protect the target surface and also to generate plasma. Ablated paint material is washed out by the curtain of flowing water.

Figure 4:
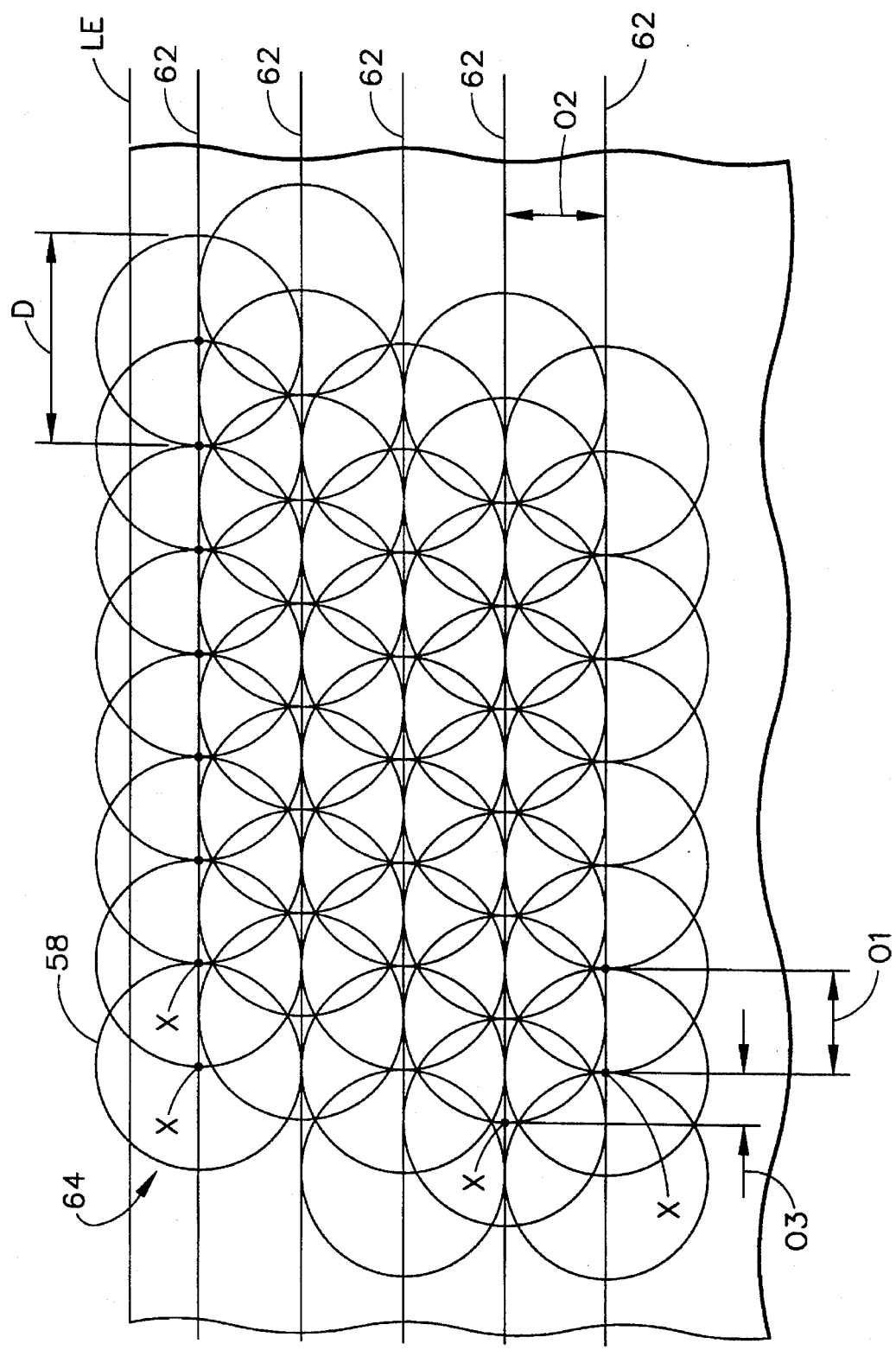
FIG. 4 is a schematic illustration of a pattern of laser shocked peened circular spots on a laser shock peened surface along a leading edge of the fan blade in FIG. 2.

Disclosed in the above referenced U.S. patent application Ser. No. 08/362,362, entitled "ON THE LASER SHOCK PEENING" which is incorporated herein by reference is information regarding "on the fly" laser shock peening. The laser may be fired sequentially "on the fly", as illustrated in FIG. 4, to hit a pattern of non adjacent centers X along a row centerline 62 of laser shocked peened circular spots 58 (indicated by the circles) having a diameter D in a row 64 of overlapping laser shock peened circular spots. The pattern may be of multiple overlapping rows 64 of overlapping shock peened circular spots on the laser shock peened surfaces 54. A first overlap is between adjacent laser shock peened circular spots 58 in a given row and is generally defined by a first offset 01 between centers X of the adjacent laser shock peened circular spots 58 and can vary from about 30%–50% or more of the diameter D. A second overlap is between adjacent laser shock peened circular spots 58 in adjacent rows and is generally defined by a second offset 02 between adjacent row centerlines 62 and can vary from about 30%–50% of the diameter D depending on applications and the strength or fluency of the laser beam. A third overlap in the form of a linear offset 03 between centers X of adjacent laser shock peened circular spots 58 in adjacent rows 64 and can vary from about 30%–50% of the diameter D depending on a particular application.

This method is designed so that only virgin or near virgin paint is ablated away without any appreciable effect or damage on the surface of the airfoil. This is to prevent even minor blemishes or remelt due to the laser which might otherwise cause unwanted aerodynamic effects on the blade's operation. Several sequences may be required to cover the entire pattern and re-painting of the laser shock peened surfaces 54 is done between each sequence of laser firings. The laser firing each sequence has multiple laser firings or pulses with a period between firings that is often referred to a "rep". During the rep the part is moved so that the next pulse occurs at the location of the next laser shocked peened circular spot 58 in the sequence. Preferably the part is moved continuously and timed to be at the appropriate location at the pulse or firing of the laser beam. One or more repeats of each sequence may be used to hit each laser shocked peened circular spot 58 more than once. This may also allow for less laser power to be used in each firing or laser pulse.

One example of the present invention is a fan blade 8 having an airfoil about 11 inches long, a chord C about 3.5 inches, and laser shock peened surfaces 54 about 2 inches long along the leading edge LE. The laser shock peened surfaces 54 are about 0.5 inches wide (W1). A first row 64 of laser shocked peened circular spots 58 nearest the leading edge LE extends past the leading edge by about 20% of the laser spot diameter D which is about 0.27" thus imparting deep compressive residual stresses in the pre-stressed region 56 below the laser shock peened surfaces 54 which extend about 0.54 inches from the leading edge. Four sequences of continuous laser firings and blade movement are used. The firings between reps of the laser are done on spots 58 which lie on unabated painted surfaces which requires a repaint between each of the sequences. Each spot 58 is hit three times and therefore three sets of four sequences are used for a total of twelve paint and repaints of the laser shock peened surface 54.

An alternative to painting and repainting is to use no painting at all and form the above mentioned plasma with metal alloy on the surface of the airfoil. After the laser shock peening process is done the laser shock peened surface may be removed to a depth sufficient to remove the remelt that forms on the surface that might interfere with the airfoils operation.

Referring more specifically to FIG. 3, the present invention includes a fan blade 8 construction with either the leading edge LE or the trailing edge TE sections or both the leading edge LE and the trailing edge TE sections having laser shock peened surfaces 54 and associated pre-stressed regions 56 with deep compressive residual stresses imparted by laser shock peening (LSP) as disclosed above. The laser shocked surface and associated pre-stressed region on the trailing edge TE section are constructed similarly to the leading edge LE section as described above. Nicks on the leading edge LE tend to be larger than nicks on the trailing edge TE and therefore the first width W1 of the leading edge section 50 may be greater than the second width W2 of the trailing edge section 70. By way of example W1 may be about 0.5 inches and W2 may be about 0.25 inches. The present invention can be used for repaired fan blades in which the stress risers in the leading and/or trailing edges LE and TE respectively, in the form of the nicks 52 and/or tears, have been suitably repaired.

While the preferred embodiment of the present invention has been described fully in order to explain its principles, it is understood that various modifications or alterations may be made to the preferred embodiment without departing from the scope of the invention as set forth in the appended claims.

We claim:

1. A gas turbine engine fan blade comprising:

a metallic airfoil having a leading edge, a trailing edge, and a radially outer tip, a first laser shock peened surface on a pressure side of said airfoil and a second laser shock peened surface on a suction side of said airfoil, said laser shock peened surfaces extending radially along a portion of and chordwise from said leading edge, laser shocked regions having deep compressive residual stresses imparted by laser shock peening (LSP) extending into said airfoil from said laser shock peened surfaces, said portion centered about an intersection of said leading edge and a predetermined nodal line of said blade.

2. A fan blade as claimed in claim 1 wherein said nodal line is of a dominant failure mode.

3. A fan blade as claimed in claim 2 wherein said laser shock peened regions extending into said airfoil from said laser shock peened surfaces are formed by simultaneously laser shock peening both sides of said airfoil.

4. A fan blade as claimed in claim 3 wherein said fan blade is a repaired fan blade.

* * * * *